US008640409B2

(12) United States Patent  (10) Patent No.: US 8,640,409 B2
Thomson  (45) Date of Patent: Feb. 4, 2014

(54) SECUREABLE CONCRETE STORAGE FACILITY

(76) Inventor: Matt Thomson, Jackson, TN (US)

( * ) Notice: Subject to any disclaimer, the term of this patent is extended or adjusted under 35 U.S.C. 154(b) by 0 days.

(21) Appl. No.: 13/451,534

(22) Filed: Apr. 19, 2012

(65) Prior Publication Data
US 2013/0008105 A1 Jan. 10, 2013

Related U.S. Application Data

(60) Provisional application No. 61/476,795, filed on Apr. 19, 2011.

(51) Int. Cl.
E04B 1/00 (2006.01)
E04B 5/43 (2006.01)

(52) U.S. Cl.
CPC .......................................... E04B 5/43 (2013.01)
USPC ............................................................ 52/251

(58) Field of Classification Search
USPC ............... 52/250, 251, 253, 258, 207, 64, 71, 52/79.9, 79.11, 223.1, 223.7
See application file for complete search history.

(56) References Cited

U.S. PATENT DOCUMENTS

| 1,511,613 | A | * | 10/1924 | Joern | 232/43.1 |
| 2,969,619 | A | | 1/1961 | Didrick | |
| 4,120,133 | A | * | 10/1978 | Rodgers et al. | 52/745.02 |
| 4,622,788 | A | * | 11/1986 | Paulsson et al. | 52/79.11 |
| 5,522,194 | A | | 6/1996 | Graulich | |
| 5,845,441 | A | | 12/1998 | Swartz | |
| 6,226,932 | B1 | | 5/2001 | Friedrich | |
| 6,233,891 | B1 | | 5/2001 | De Cosse | |
| 6,286,269 | B1 | * | 9/2001 | Marcum | 52/79.5 |
| 7,963,073 | B1 | * | 6/2011 | Pellegrene et al. | 52/125.2 |
| 2002/0011035 | A1 | * | 1/2002 | Boyer et al. | 52/79.5 |
| 2004/0025448 | A1 | | 2/2004 | Puusepp et al. | |
| 2007/0251519 | A1 | | 11/2007 | Anikhindi et al. | |
| 2007/0277458 | A1 | * | 12/2007 | Graboyes | 52/232 |
| 2010/0132271 | A1 | * | 6/2010 | Fernandez Fernandez | 52/79.9 |
| 2011/0083379 | A1 | * | 4/2011 | Lavi | 52/79.1 |
| 2011/0162293 | A1 | * | 7/2011 | Levy et al. | 52/79.9 |

FOREIGN PATENT DOCUMENTS

| EP | 0572357 | 12/1993 |
| JP | 2004108041 | 4/2004 |
| WO | 2007129141 | 11/2007 |

OTHER PUBLICATIONS

International Search Report and the Written Opinion of the International Searching Authority, or the Declaration, 8 pages, Oct. 16, 2012.

* cited by examiner

Primary Examiner — William Gilbert
Assistant Examiner — Kyle Walraed-Sullivan
(74) Attorney, Agent, or Firm — Waddey Patterson PC; Matthew C. Cox

(57) ABSTRACT

A pre-stressed concrete storage apparatus includes a plurality of panels secured together to form a hollow interior space for storing items. An outer door panel is selectively movable for restricting access to the interior of the apparatus. A secondary metal door and cage assembly is located behind the primary outer door panel for further restricting access to the interior of the storage apparatus. A pulley system is provided for mechanically lifting and lowering the outer door panel.

4 Claims, 17 Drawing Sheets

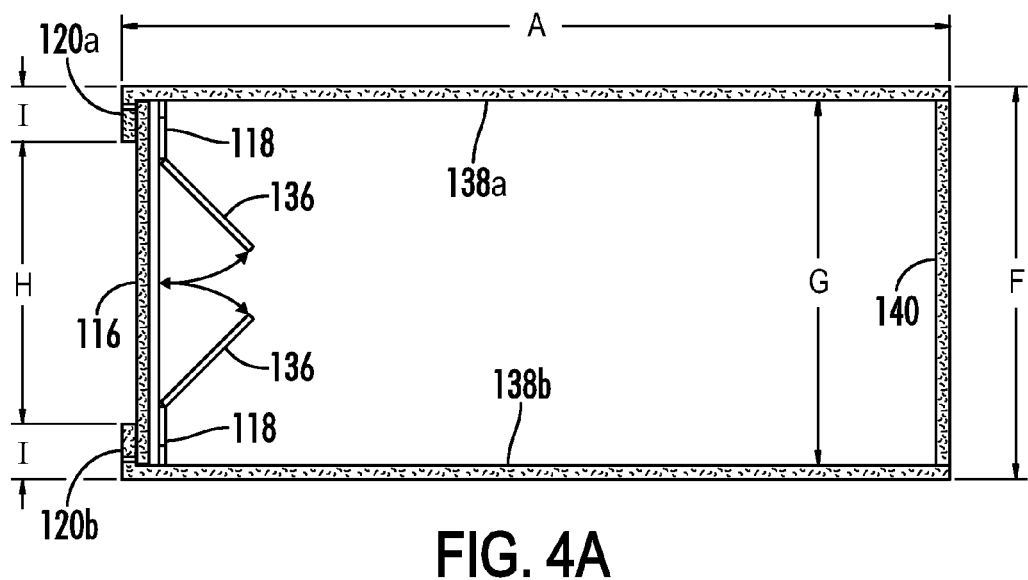
FIG. 4A
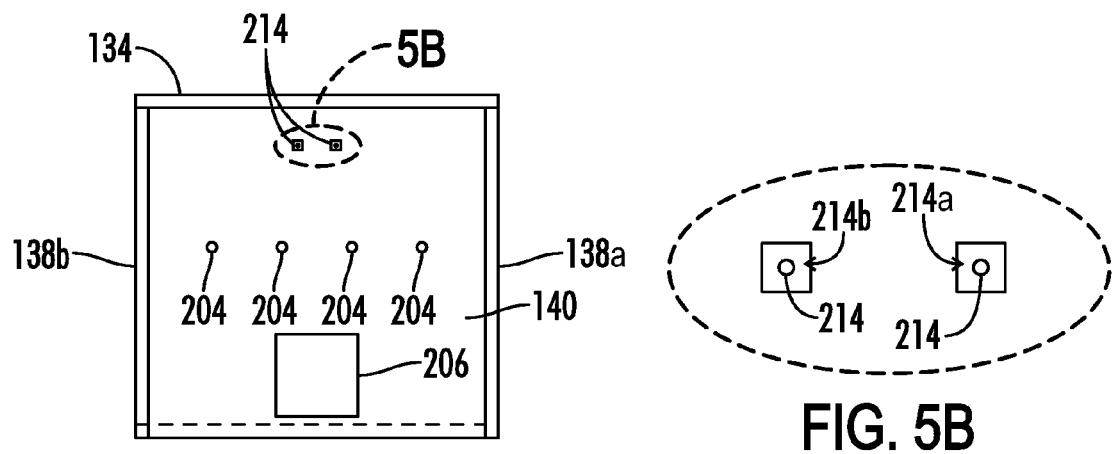
FIG. 5A
FIG. 5B

SECUREABLE CONCRETE STORAGE FACILITY

CROSS-REFERENCES TO RELATED APPLICATIONS

This application claims priority to U.S. Provisional Patent Application No. 61/476,795 titled "Securable Concrete Storage Facility" filed Apr. 19, 2011, which is hereby incorporated by reference in its entirety.

BACKGROUND

1. Technical Field

The present disclosure relates generally to structures for storing items such as equipment, materials and/or people. More particularly, the present disclosure relates to a structure that can be moved to a construction site and can be secured for storing items therein.

2. Background Art

Many construction sites such as pipelines, highways, power transmission lines, etc. are linear in nature. Such construction projects can be very remote and may require numerous pieces of large industrial equipment. One problem encountered by contractors and developers of such projects involves on-site management of equipment. The equipment and supplies that the contractor uses to complete the project are usually very expensive. Logistical considerations require such contractors and developers to store supplies and equipment on-site where it is convenient and can be accessed on demand during the project. As a job progresses, a storage site can be intermittently moved to new locations corresponding to the progress of construction such that the equipment and materials are located near the position they are needed the most.

Conventional practices typically involve storing equipment and materials on-site at jobsite locations during periods of non-use in storage containers. Such conventional storage containers can include the type of containers used in transoceanic shipping. Conventional job-site storage containers can include a metal frame having corrugated panels and one or more hinged doors for accessing the interior of the container. A mechanical lock is commonly attached to the doors for securing the contents inside. Such containers can be picked up using a crane or a large truck and can be transported along the development path of the project.

This type of conventional jobsite storage container, however, is susceptible to break-in using hammers, bolt cutters, blow torches or other readily available tools. As a result, contractors and developers are often reluctant to store expensive items in such conventional containers during periods of non-use.

Another alternative available to contractors and developers for protecting expensive equipment stored on-site is to hire security personnel to monitor such storage containers during periods of non-use of the stored equipment. However, this option is prohibitively expensive in most applications, particularly in long duration projects.

The concern of theft of expensive equipment and potential delays in workflow creates significant problems for contractors and developers who logistically need to store equipment on-site. Because of these problems with conventional storage systems, man contractors essentially mobilize and de-mobilize project sites on a daily basis.

An additional problem associated with storing materials at such worksites is the storage of fuel. Fuel is commonly necessary for operating equipment. However, fuel tanks are often subject to theft or vandalism when left on-site during periods of non-use. Additionally, firearm users frequently shoot at fuel tanks left at construction sites, thereby damaging or ruining the fuel storage containers. Spilled fuel can lead to pollution and environmental cleanup concerns that can be extremely expensive to remedy. This places a significant burden on contractors who are oftentimes responsible for paying for pollution cleanup when fuel is leaked.

What is needed then is an improved storage facility for securely housing items at jobsite locations.

BRIEF SUMMARY

The present disclosure provides a pre-stressed concrete jobsite storage apparatus that can be used to securely store items at a construction site.

One object of the disclosure is to provide an apparatus that can withstand attempts at break-in or vandalism.

Another object of the disclosure is to provide an apparatus that is too large and heavy to be easily stolen.

A further object of the disclosure is to provide a storage apparatus that can be pre-assembled and moved to a jobsite using a conventional truck or crane.

Yet another object of the disclosure is to provide an apparatus that may serve as a temporary shelter for individuals at a jobsite.

In some embodiments, the present disclosure provides a concrete storage facility comprising: a first pre-stressed concrete side panel having a first vertical edge and a first panel flange extending substantially perpendicularly from the first vertical edge of the first side panel; a second pre-stressed concrete side panel positioned opposite the first pre-stressed concrete side panel, the second side panel having a second vertical edge and a second panel flange extending from the second vertical edge, the second panel flange extending toward the first panel flange; a first angle bracket attached to the first side panel, the first angle bracket including a first bracket flange protruding from the first angle bracket substantially parallel to the first panel flange, the first bracket flange defining a first flange gap between the first bracket flange and the first panel flange; a second angle bracket attached to the second side panel, the second angle bracket including a second bracket flange protruding from the second angle bracket substantially parallel to the second panel flange, the second bracket flange defining a second flange gap between the second bracket flange and the second panel flange; and a pre-stressed concrete door having a first vertical door edge slidably disposed in the first flange gap and a second vertical door edge slidably disposed in the second flange gap.

In a further embodiment, the present disclosure provides a storage apparatus, comprising: a floor panel; a first side panel oriented substantially perpendicular to the floor panel, the first side panel including a first vertical edge; a second side panel oriented substantially perpendicular to the floor panel opposite the first side panel, the second side panel including a second vertical edge; a top panel resting on the first and second side panels opposite the floor panel; a first panel flange extending perpendicularly from the first vertical edge; a second panel flange extending perpendicularly from the second vertical edge; a vertically movable concrete outer door panel positioned between the first and second side panels; and an end panel positioned opposite the outer door panel, wherein the outer door panel is configured to slidably engage the first and second panel flanges.

Numerous other objects, advantages and features of the present invention will be readily apparent to those of skill in the art upon a review of the following drawings and description of a preferred embodiment.

BRIEF DESCRIPTION OF THE DRAWINGS

FIG. 4A illustrates a plan view of an embodiment of a storage apparatus in accordance with the present disclosure.

FIG. 5A illustrates an end elevation view of an embodiment of a storage apparatus in accordance with the present disclosure.

FIG. 5B illustrates a detail view of Section 5B of FIG. 5A showing electrical connectors in accordance with the present disclosure.

DETAILED DESCRIPTION

Figure 1:
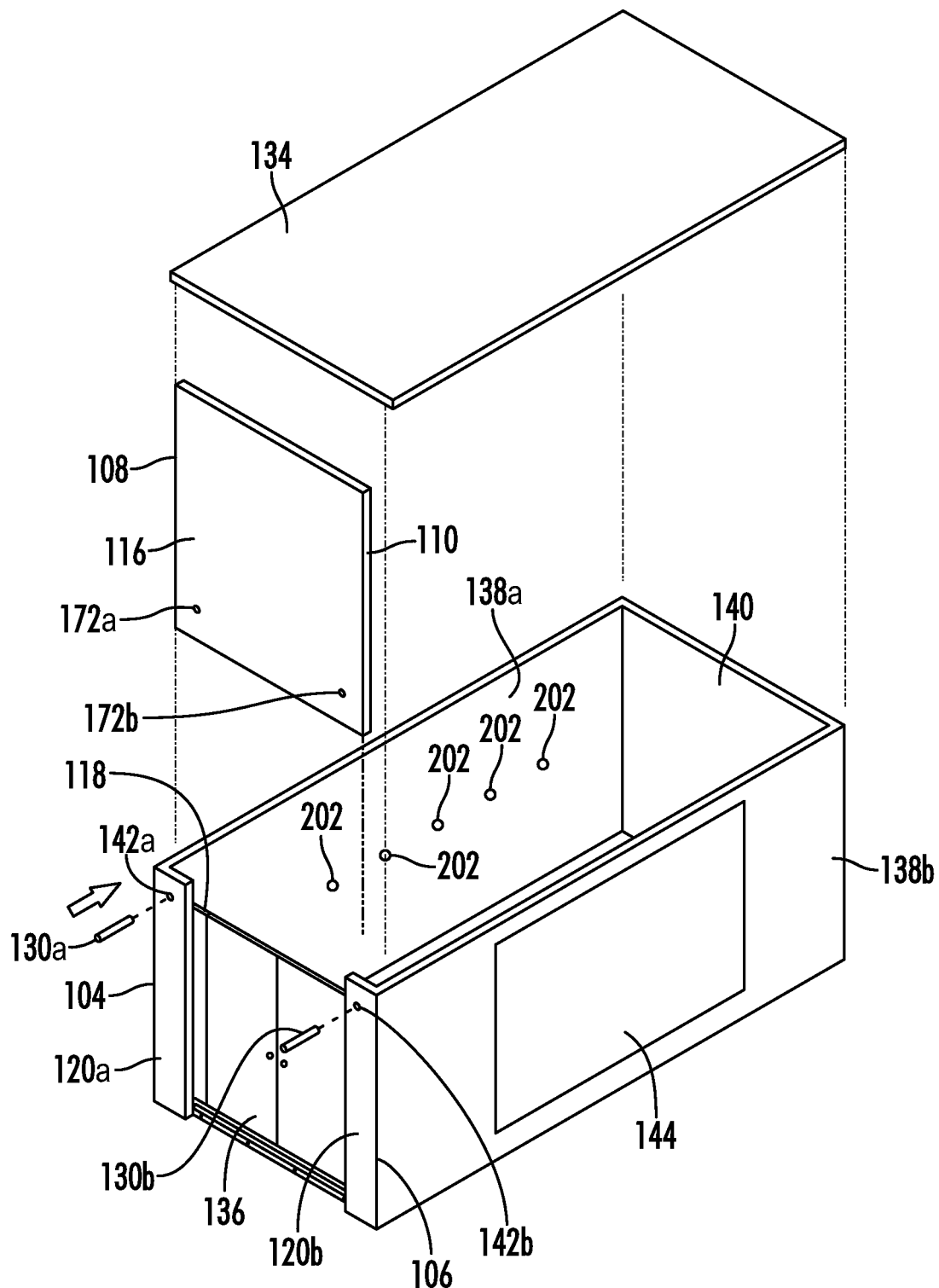
FIG. 1 illustrates a partially exploded perspective view of an embodiment of a storage apparatus in accordance with the present disclosure.

Referring now to the drawings, one embodiment of the present disclosure provides a storage apparatus, illustrated generally in FIG. 1 and designated by the numeral 100. It is understood that in the drawings, not all reference numbers are included in each drawing, for the sake of clarity. In addition, positional terms such as a "upper," "lower," "side," "top," "bottom," "vertical," "horizontal," etc. refer to the apparatus when in the orientation shown in the drawing. The skilled artisan will recognize that objects in accordance with the present disclosure can assume different orientations when in use. The drawings illustrate various embodiments and are not intended to provide dimensional or scale limitations on the claims. It is understood that various other embodiments can include numerous scale and dimensional characteristics that are not illustrated.

Figure 11A:
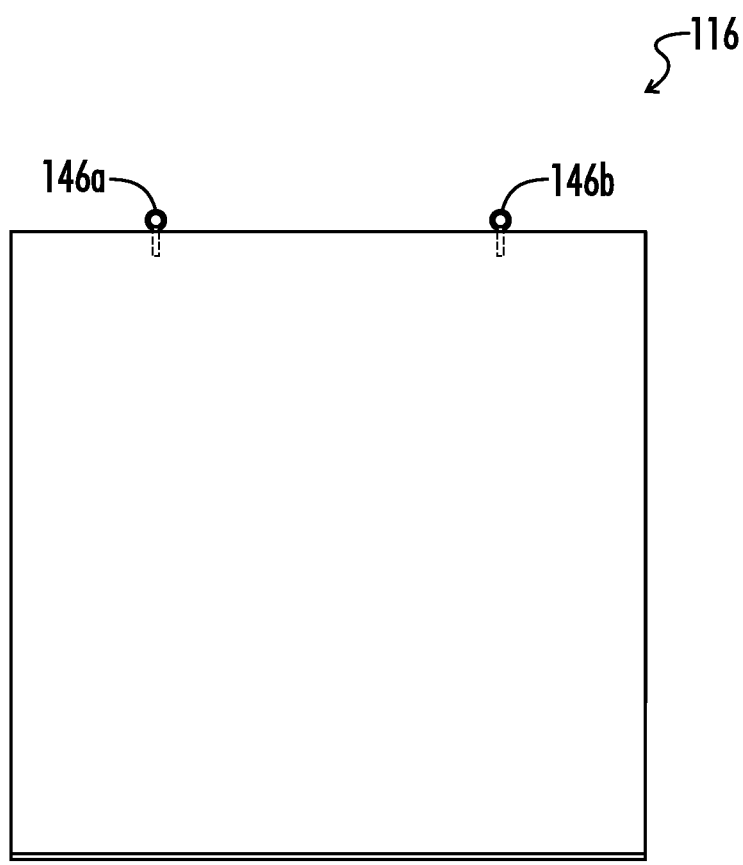
FIG. 11A illustrates a front elevation view of an embodiment of an outer door panel including door lift anchors in accordance with the present disclosure.

Referring to FIG. 1, a storage apparatus 100 includes a top panel 134, a first side panel 138a, a second side panel 138b, and a bottom panel 152. The terms "panel" and "wall" may be used interchangeably to describe the components of storage apparatus 100. Top panel 134 is generally supported by the first and second side panels 138a, 138b. An end panel 140 is disposed at one longitudinal end of the storage apparatus 100. As such, the storage apparatus 100 forms an enclosed structure housing an interior space for storing items A door assembly is disposed on the storage apparatus 100 at the longitudinal end opposite end panel 140. The door assembly includes a vertically sliding outer door panel 116 and a fixed interior door panel 118. FIG. 11A illustrates an outer door panel 116 including first and second door lift anchors 146a, 146b.

Outer door panel 116 includes a pre-stressed concrete slab door that is generally configured to be vertically movable. Outer door panel 116 includes a first door panel vertical edge 108 and a second door panel vertical edge 110.

Figure 12A:
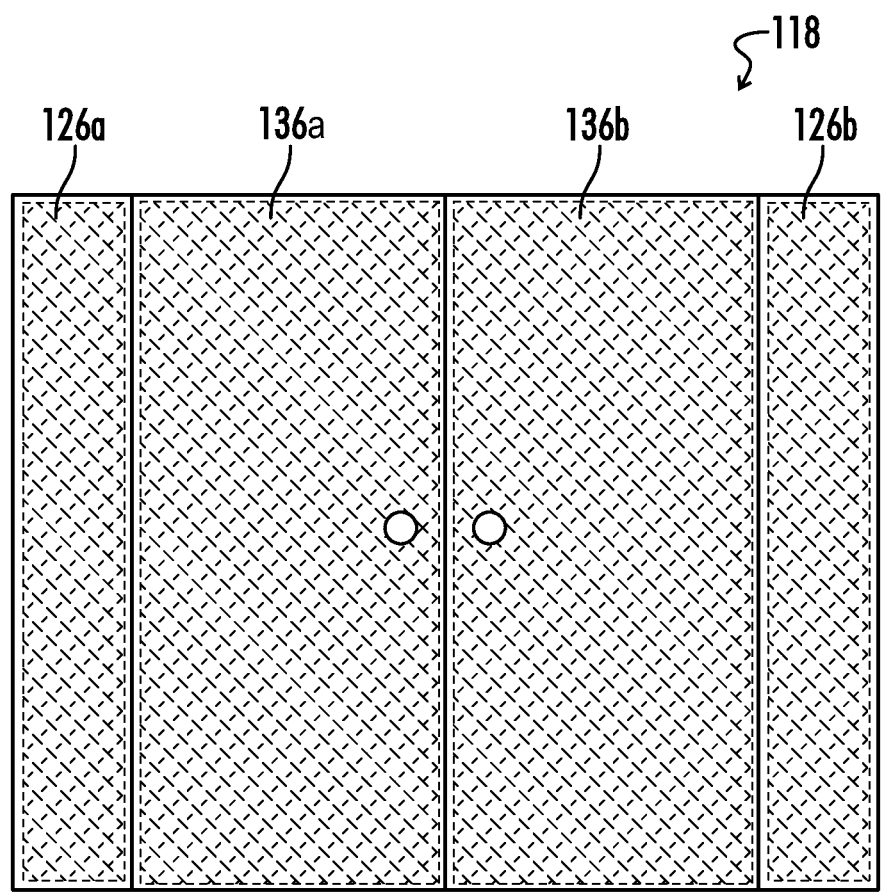
FIG. 12A illustrates a front elevation view of an embodiment of an interior door panel including an entry door in accordance with the present disclosure.

Interior door panel 118 includes welded wire fabric (WWF) in some embodiments. Referring to FIG. 12A, in some embodiments, interior door panel 118 includes first and second cage supports 126a, 126b. Each of first and second cage supports 126a, 126b are configured to be fixed in place in the entry to apparatus 100. A first entry door 136a is hingedly attached to first cage support 126a, and a second entry door 136b may be hingedly attached to second cage support 126b. Access to the interior of the storage apparatus 100 is through the end of the unit containing door assembly. Each entry door 136a, 136b can include a separate security system such as an additional lock or code-access feature for further controlling access to storage facility 100. In some embodiments, each entry door and each cage support includes a single layer or a double layer wire mesh, or wire fabric mounted on a rigid steel perimeter frame. In some embodiments, only a single entry door 136 is positioned behind outer door panel 116. Outer door panel 116 can be selectively raised vertically such that entry door 136 can be used to access the interior of storage facility 100. When outer door panel 116 is in the closed position, as seen in FIG. 1, access to entry door 136 is blocked. When outer door panel 116 is in a raised, or partially raised, position, as seen in FIG. 2B, entry door 136 is accessible.

In some embodiments, top panel 134, side panels 138a, 138b, end panel 140, and outer door panel 116 in some embodiments are formed of concrete. Outer door panel 116 can include a pre-stressed concrete material. In some embodiments, outer door panel 116 includes pre-stressed concrete reinforced with steel fibers such as but not limited to Novocon® 1050 steel fibers manufactured by Propex Concrete Systems of Chattanooga, Tenn. In other embodiments, other types of steel fibers having similar properties can be used to reinforce outer door panel 116. Additionally, each concrete panel disposed on facility 100 can include similar reinforcing steel fibers. Steel fiber reinforcement of concrete panels provides additional resistance to penetration by tools that could be used to break into the storage apparatus 100, such as hammers, chisels, prybars, drills, etc.

In some embodiments, each panel in apparatus 100 includes concrete at 5000 psi and includes steel reinforcement fibers. Reinforcement fibers are grade 60 in some embodiments. In addition, pre-stressing strands may be held in tension in each panel. In some embodiments, each panel is pre-stressed with one or more pre-stressing strands including non-coated, one-half inch seven-wire at 270 kpi. In various other embodiments, other types of pre-stressing strands may be used in pre-stressed concrete panels in apparatus 100, including but not limited to pre-tensioned and post-tensioned strands in bonded or un-bonded configurations.

Each of the panels can be joined together prior to positioning at a construction site. For example, storage apparatus 100 can be pre-assembled and shipped in a pre-assembled state to a remote construction site as a complete unit. Alternatively, storage apparatus 100 may be assembled on-site at a construction location in some applications. In some embodiments, one or more panels on storage apparatus 100 may be joined by welding. In other embodiments, other suitable concrete panel joining techniques may be used to join the separate panels of storage apparatus 100.

Referring now to FIGS. 2A-3B, in some embodiments, a door assembly includes a novel construction for providing a sliding joint between outer door panel 116 and storage apparatus 100. Storage apparatus 100 can include a first side wall 138a forming a first panel flange, or first side flange 120a protruding from a first vertical edge 104 of first side wall 138a. In some embodiments, first panel flange 120a extends substantially perpendicular to first side wall 138a. Similarly, second side wall 138b includes a second panel flange, or second side flange 120b protruding from a second vertical edge 106 of second side wall 138b generally toward first side flange 120a. First and second panel flanges 120a, 120b can include a reinforced pre-stressed concrete or any other suitable rigid material such as metal. In some embodiments, first panel flange 120a is integrally formed on first side wall 138a and second panel flange 120b is integrally formed on second side wall 138b. Each panel flange 120a, 120b can form a right angle relative to its corresponding side wall in some embodiments.

Figure 6:
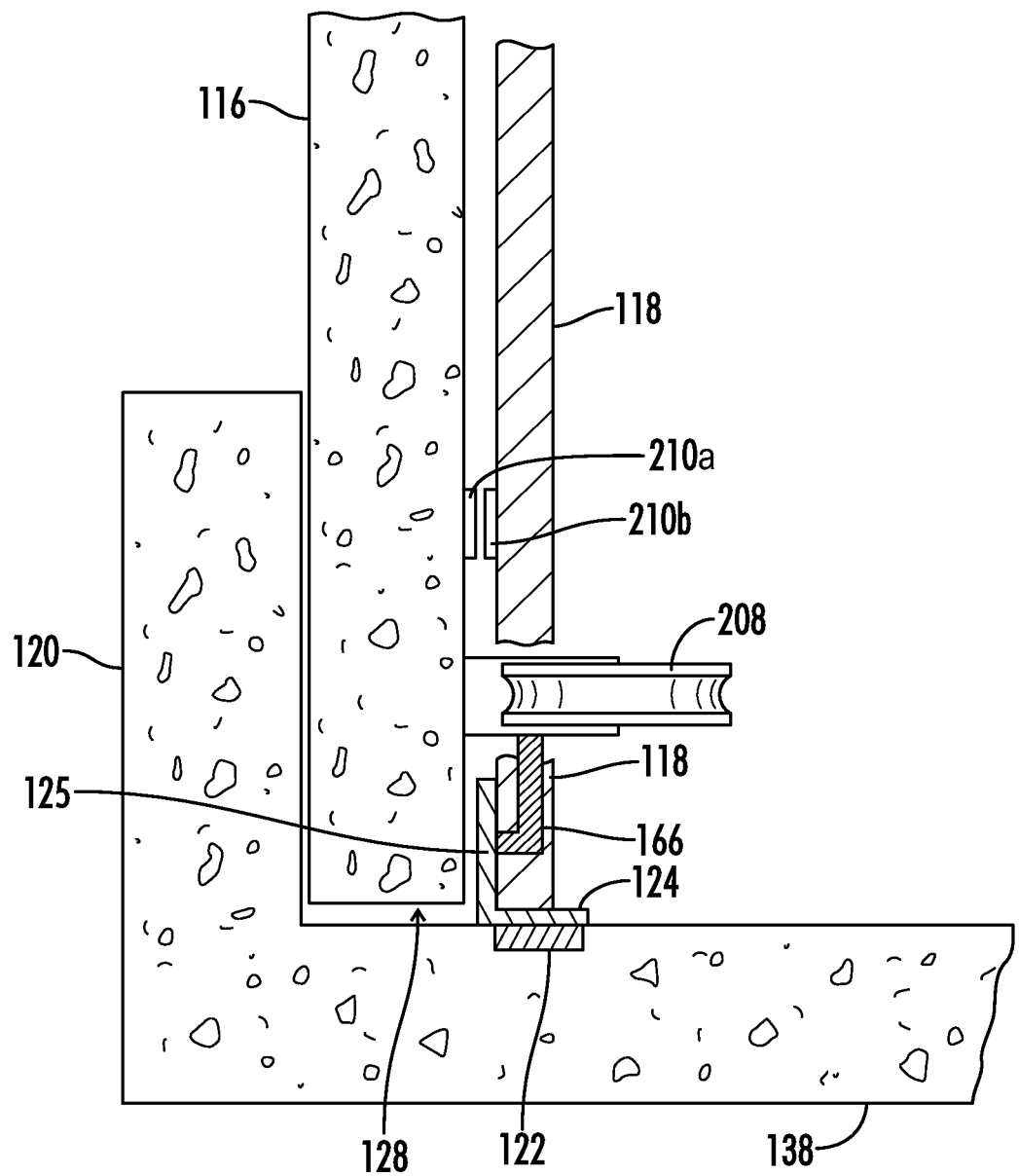
FIG. 6 illustrates a detail partial cross-sectional view of an embodiment of a door assembly for a storage apparatus in accordance with the present disclosure.

As seen in FIG. 6, a metal plate 122 can be disposed on each side wall 138 near a flange 120 in some embodiments. As seen in FIG. 10B, metal plate 122 may extend almost the entire height of each side panel 138. Metal plate 122 in some embodiments includes a steel plate embedded in the side panel 138. Metal plate 122 can include an embedded steel plate with dimensions of about two inches wide by about eight feet four inches tall by about five sixteenth of an inch thick in some embodiments. In other embodiments, each metal plate 122 may include various other suitable dimensions. Metal plate 122 can be cast into concrete side wall 138, as seen in FIG. 6. In some embodiments, a first metal plate 122a is embedded in first side wall 138a, and a second metal plate 122b is embedded in second side wall 138b.

A metal angle bracket 124, or door guide, can be secured to metal plate 122. Metal angle bracket 124 can be welded to a metal plate 122 in some embodiments. In other embodiments, each metal angle bracket 124 may be secured to a corresponding metal plate 122 using other suitable fastening means, such as using fasteners. Each metal angle bracket 124 includes a bracket flange 125 protruding away from metal plate 122. Bracket flange 125 is oriented generally parallel to its neighboring side flange, or panel flange 120. As such, each panel flange 120 and bracket flange 125 define a flange gap 128 therebetween. Flange gap 128 is generally slightly larger than the thickness of outer door panel 116 such that a vertical edge of outer door panel 116 can be slidably received in flange gap 128. In some embodiments, a clearance of about one-half inch is defined on each side of each vertical edge of outer door panel 116 for allowing outer door panel 116 to slide freely in flange gap 128. A first flange gap is formed on the first side of outer door panel 116 nearest first panel flange 120a, and a second flange gap is formed on the opposite second side of outer door panel 116 nearest second panel flange 120b.

Referring further to FIG. 4A and to FIG. 6, in some embodiments, interior door panel 118 spans across the entry of door assembly and can be secured at opposing edges generally to first and second side panels 138a, 138b. In some embodiments, interior door panel 118 can be secured by welding or fastening to each angle bracket 124 on each side panel. For example, a first vertical edge of interior door panel can be secured to a first angle bracket attached to first side panel 138a, and the opposing second vertical edge of interior door panel can be secured to a second angle bracket attached to second side panel 138b. In some embodiments, interior door panel 118 is welded to the bracket flange 125 on each angle bracket 124. In other embodiments, interior door panel 118 may be welded to various other features on each angle bracket 124, or alternatively to each metal plate 122.

Figure 3A:
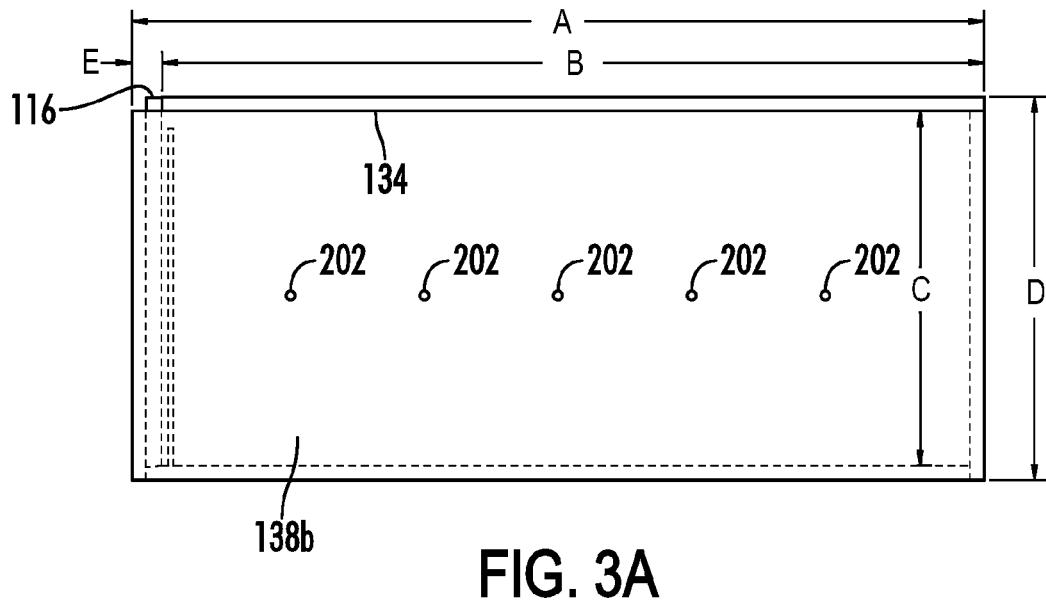
FIG. 3A illustrates a side elevation view of an embodiment of a storage apparatus with outer door panel in a closed position in accordance with the present disclosure.
Figure 3B:
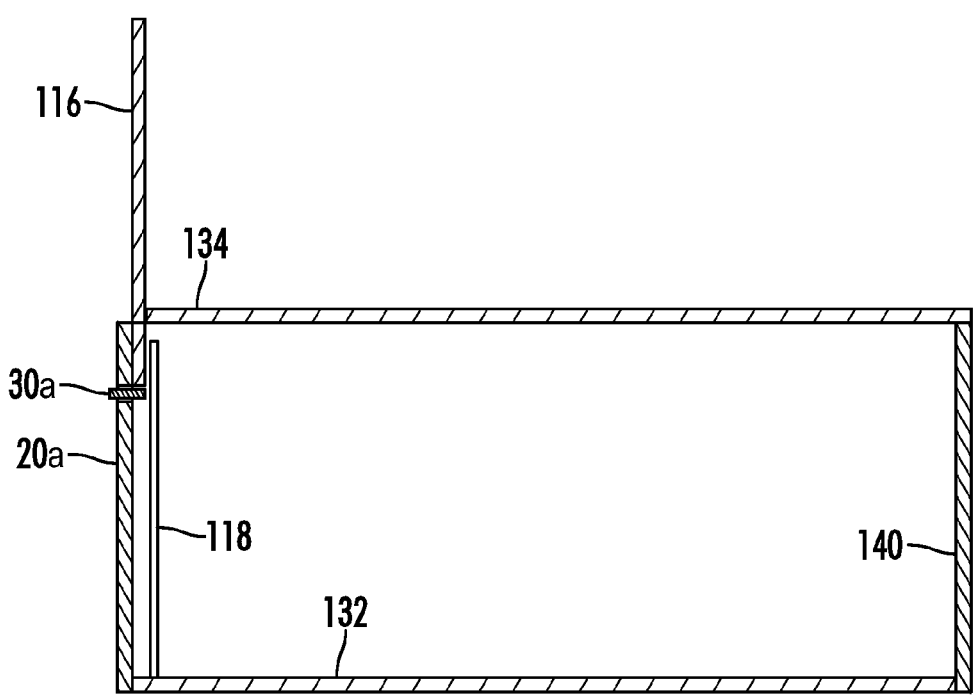
FIG. 3B illustrates a partial cross-sectional side elevation view of the embodiment of a storage apparatus of FIG. 3A with the outer door panel in an open position in accordance with the present disclosure.

In some applications, it may be desirable to mechanically fix, or anchor, outer door panel 116 in an open position to prevent outer door panel 116 from inadvertently falling. To achieve this, one or more door pin sockets 172a, 172b can be formed on outer door panel 116. Each door pin socket 172a, 172b can be shaped to receive an anchor pin, 130a, 130b, as seen in FIG. 1. When the outer door panel 116 is in an open position as seen in FIG. 3B, each door pin socket 172a, 172b is aligned with a corresponding flange pin hole 142a, 142b defined in a side flange 120a, 120b, seen in FIG. 1. Each flange pin hole 142a, 142b in some embodiments, includes a five-eighths inch through hole defined through its corresponding flange 120a, 120b. An anchor pin 130a, 130b can be inserted through the flange pin hole 142a, 142b and also through a corresponding door pin socket 172a, 172b such that each anchor pin 130a, 130b prevents outer door panel 116 from moving relative to storage facility 10. In some embodiments, a rigid pipe sleeve is disposed in each flange pin hole 142a, 142b to provide additional strength. In additional embodiments, each door pin socket can be positioned on door panel 116 to align with a corresponding flange pin hole when door panel 116 is in a closed position for securing door panel 116 in the closed position.

Figure 11B:
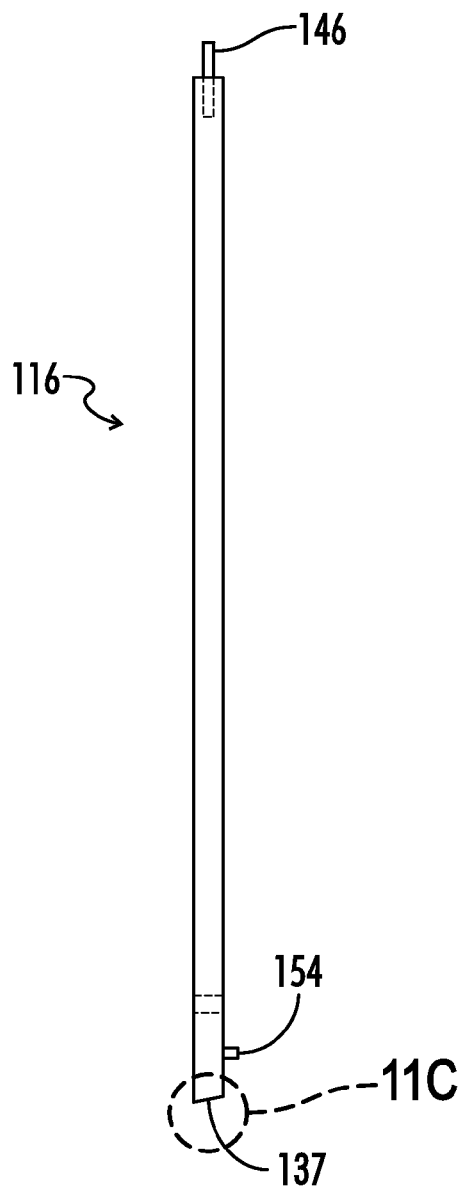
FIG. 11B illustrates a side elevation view of the outer door panel of FIG. 11A.
Figure 11C:
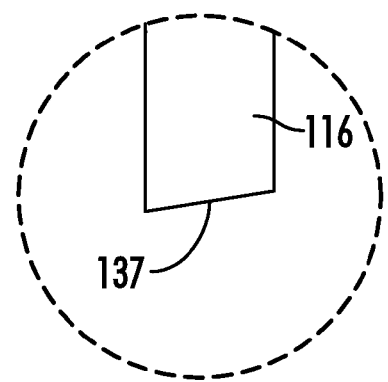
FIG. 11C illustrates a detail view of Section 11C of FIG. 11B showing a tapered lower door edge.

As seen in FIG. 2B and FIG. 3B, in some embodiments, outer door panel 116 can be raised and secured at a raised position by allowing one or both anchor pins 130a, 130b to engage lower door edge 137, seen in FIG. 11B and 11C, when each anchor pin is inserted in its corresponding pin hole 142a, 142b, etc. As such, each pin prevents outer door panel 116 from falling shut as a redundant safety feature in the event that the mechanical door lifting feature were to fail. As seen in FIG. 11B and 11C, in some embodiments, lower door edge 127 includes a tapered profile.

Figure 2A:
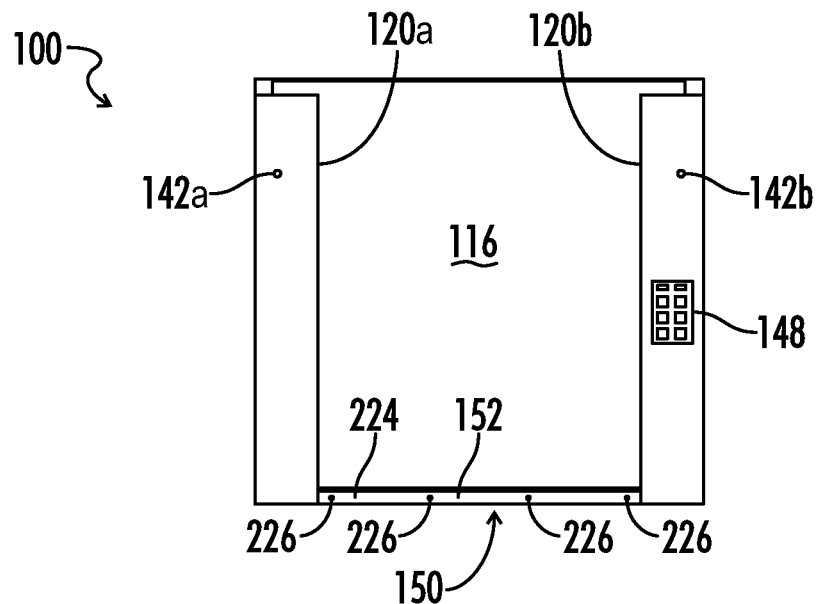
FIG. 2A illustrates a front end elevation view showing an embodiment of a storage apparatus with outer door panel in a closed position in accordance with the present disclosure.
Figure 2B:
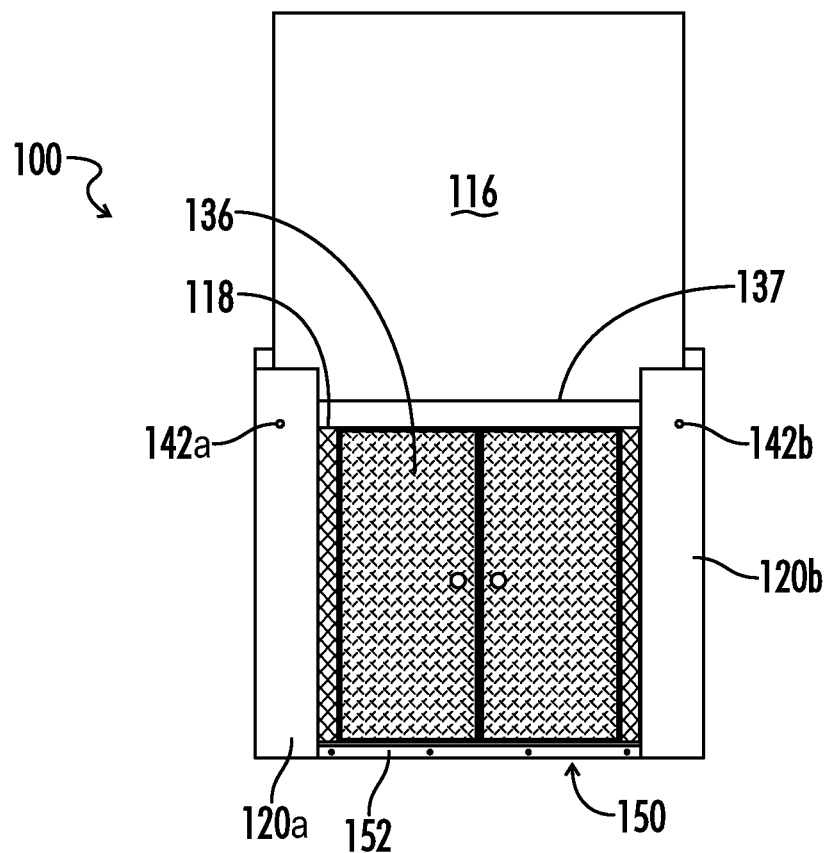
FIG. 2B illustrates a front end elevation view showing an embodiment of a storage apparatus with outer door panel in an open position in accordance with the present disclosure.

Referring further to FIG. 2A, an electronic control device such as a keypad console 148 may be used to control access to the storage apparatus 100 in some embodiments. A user can enter a code on keypad console 148, and a mechanical lift positioned on storage apparatus 100 will mechanically lift the outer door panel 116 to an elevated position, as seen in FIG. 2B. An access code can be programmed on the keypad console 148, and the code can be changed by an administrator for security reasons. Outer door panel 116 can be equipped with a global positioning satellite (GPS) transceiver that can receive location data from a satellite and can transmit a location signal representative of the location of the outer door panel 116 in three-dimensional space. The location signal can be monitored from an on-site or off-site location such that unauthorized movement of outer door panel 116 will be detected via the location signal sent by the GPS transceiver in some embodiments. In some embodiments, the location signal is sent via a cellular communication network wirelessly to a cellular base station using a mobile electronic device. The GPS transceiver will also be able to detect movement of the entire storage apparatus 100.

Figure 15:
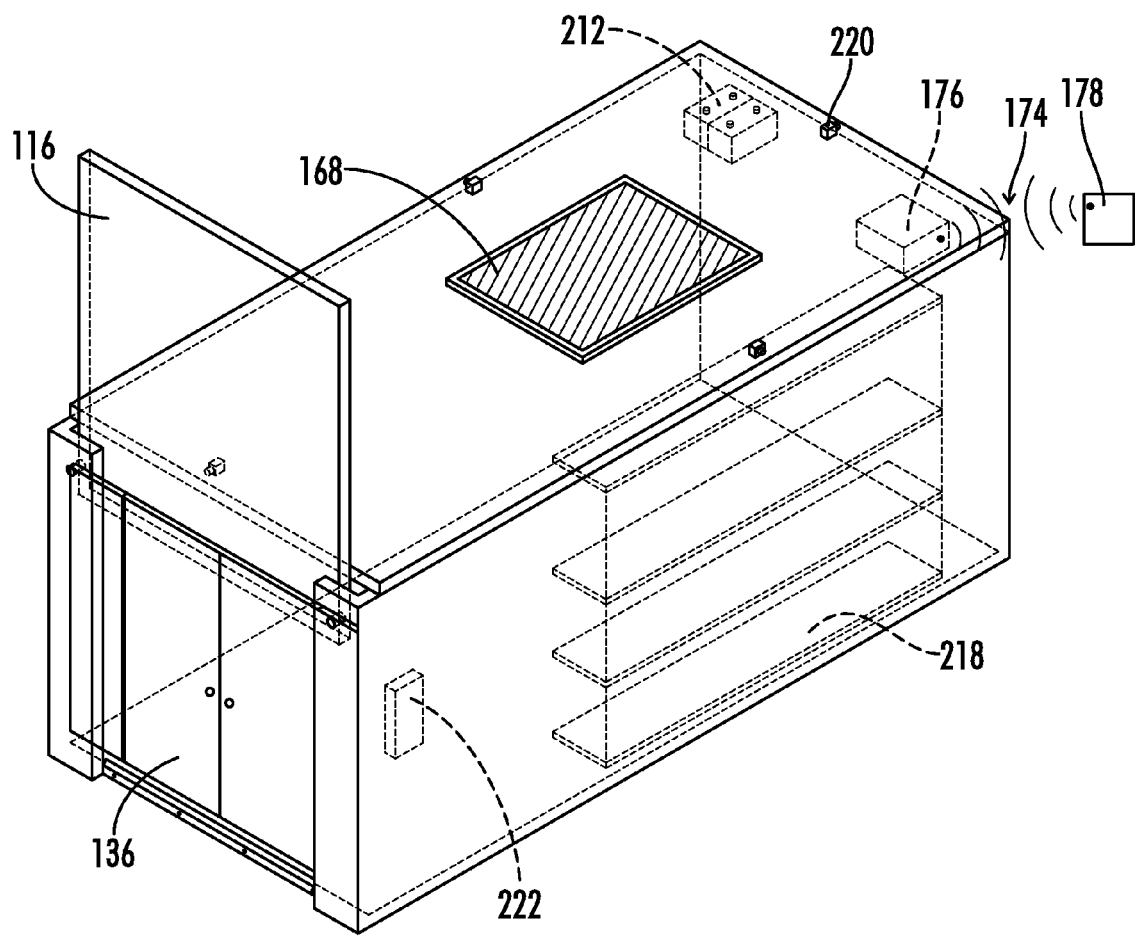
FIG. 15 illustrates a perspective view of an embodiment of a storage apparatus in accordance with the present disclosure.

In some applications an external keypad console 148 may be susceptible to vandalism or damage from the weather or working environment. Referring to FIG. 15, in some embodiments, communications module 176 can be housed within storage apparatus 100. Communications module 176 can include a wireless transceiver receiver operable to receive a communication signal 174 emitted by an external wireless transmitter 178, or signal transceiver, from outside of storage apparatus 100. For example, a signal emitter or transceiver 178 can be positioned in a worker's automobile, similar to a garage door opener in some embodiments. Communications module 176 can be operably connected to a motor or electronic motor control circuitry for mechanically raising and/or lowering outer door panel 116 in some embodiments. Thus, a user can transmit a communication signal 174 remotely for raising door panel 116 without actually contacting storage apparatus 100. Additionally, communication module 176 can include a weather station for communicating or recording weather information in some embodiments. Additionally, because communication module 176 is housed within the interior of storage apparatus 100 in some embodiments, the electronics associated with opening outer door panel 116 are not exposed to the elements and are not susceptible to vandalism from the outside. In some embodiments, communication signal 174 is a radio frequency signal. In further embodiments communication signal 174 can include other suitable types of wireless communication signals.

Also seen in FIG. 15, in some embodiments, one or more battery banks 212 may be mounted on the interior of storage apparatus 100. The battery banks 212 may be mounted on the ceiling along with communication module 176 in some embodiments. Referring to FIG. 5A and FIG. 5B, in some embodiments, one or more electrical connectors 214 may be disposed on end panel 140. Each electrical connector 214 may be connected to battery bank 212 and/or communication module 176. Each electrical connector in some embodiments includes a bulkhead connector for coupling electronic components inside storage apparatus 100 to an external power source such as a generator, an electrical outlet, or an external battery bank. Each electrical connector 214 may be housed in a recessed region in concrete end wall 140. For example, first electrical connector 214a is housed in a first recess 216a. Second electrical connector 214b is housed in a second recess 216b. In some embodiments, each recess includes a square recess having recess depth of about one inch and recess dimensions of about three inches by about three inches.

Also seen in FIG. 5A, in some embodiments, end panel 140 includes an escape hatch 206 in some embodiments. Escape hatch 206 may include a removable door having dimensions of about two feet by about two feet in some embodiments.

Referring further to FIG. 5A, in some embodiments, end panel 140 includes one or more threaded end wall inserts 204. Each threaded end wall insert 204 includes a threaded metal tube that can be housed in the concrete wall. The concrete is generally formed around each end wall insert 204. Each insert 204 can be used to insert an attachment location for an item such as a threaded hook, bolt or fastener for lifting or positioning end panel 140 or for mounting an external device such as an extension arm, ladder, shelf, etc. Alternatively, in some embodiments, each threaded end wall insert 204 includes a threaded stud protruding from end wall 140 for attachment to an external device. Also, each side panel 138a, 138b includes similar threaded side panel inserts 202, seen for example in FIG. 1 and FIG. 3A in some embodiments.

Figure 7A:
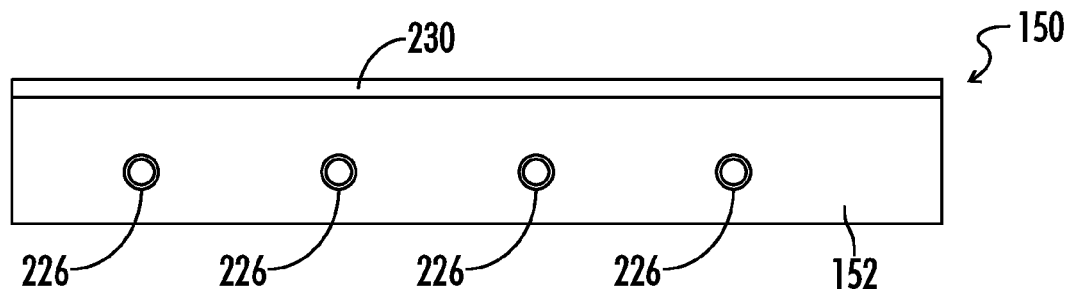
FIG. 7A illustrates a front end elevation view of an embodiment of a floor panel in accordance with the present disclosure.
Figure 7B:
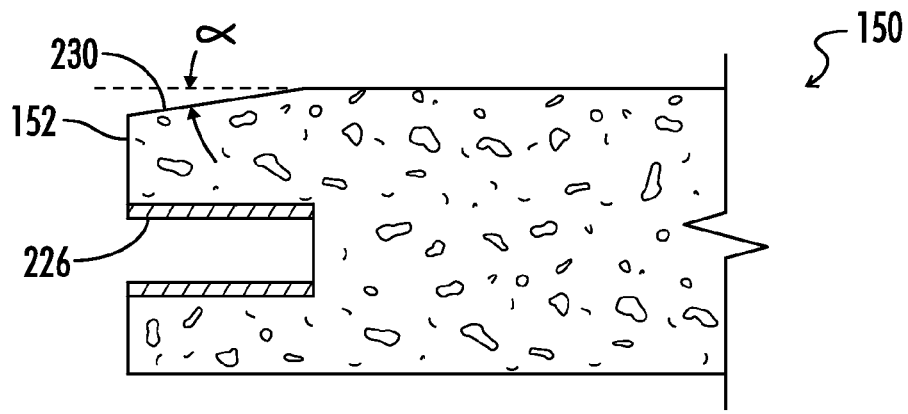
FIG. 7B illustrates a detail partial cross-sectional view of an embodiment of a floor panel with an insert in accordance with the present disclosure.

Referring again to FIG. 2A and FIG. 2B, in some embodiments, a floor panel 150, or bottom panel, is disposed on the bottom of the apparatus 100. Floor panel 150, also seen in FIGS. 7A-7C, includes a pre-stressed concrete panel including a substantially rectangular profile in some embodiments. Floor panel 150 includes a front floor panel edge 152 spanning between opposing panel flanges 120a, 120b at the entry of storage apparatus 100. In some embodiments, floor panel 150 includes a thickness of about four inches. This thickness provides a significant step up to enter the apparatus. In some embodiments, to reduce the size of the step and the entry of apparatus 100, a tapered front floor panel edge is provided. Tapered front floor panel edge 152 includes a floor panel having an angled top corner, as seen in FIG. 7B. In some embodiments, the angled top corner 230 is angled at about nine degrees. In other embodiments, the angled top corner may be angled at any other suitable angle between about five degrees and about fifteen degrees. Various other angles between zero and ninety degrees may also be used on angled top corner of tapered front floor panel edge 152 in some embodiments.

In some embodiments, it may be necessary to provide a ramp leading from a surrounding ground region up or down to the entry of apparatus 100. One or more ramp inserts 226 are embedded in floor panel 150 near or adjacent front floor panel edge 152 in some embodiments. Each ramp insert 226 may include a threaded socket insert such as a threaded metal sleeve or tube in some embodiments. Each ramp insert 226 provides an attachment point for securing a ramp to floor panel 150. In alternative embodiments, each ramp insert 226 includes a post extending from floor panel 150.

Figure 7C:
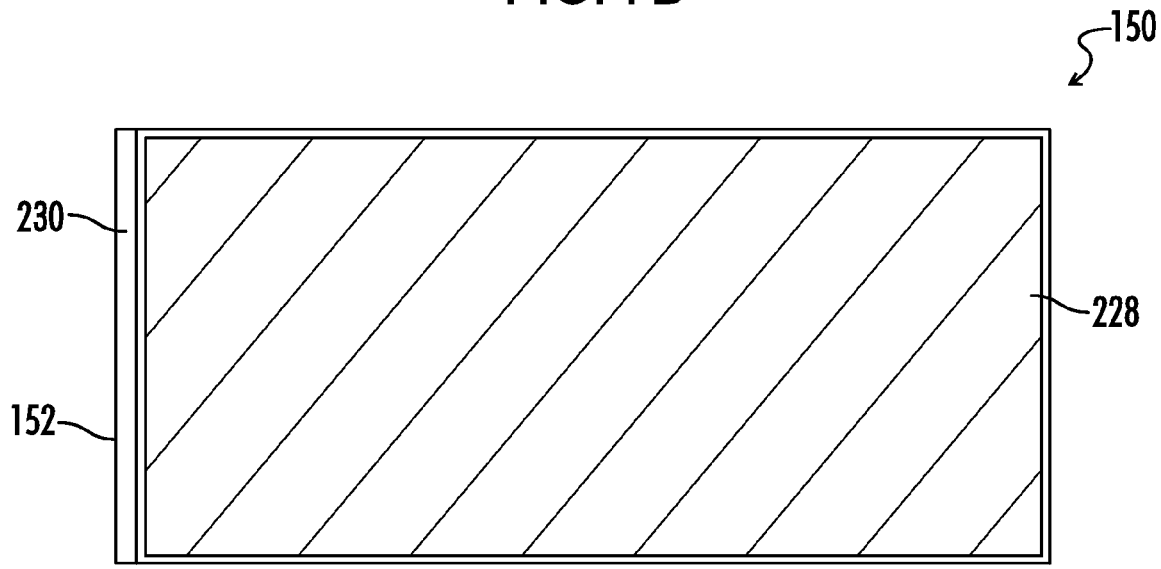
FIG. 7C illustrates a plan view of an embodiment of a floor panel in accordance with the present disclosure.

Referring further to FIG. 7C, in some embodiments, a floor coating 228 is disposed on the interior of floor panel 150. Floor coating 228 includes a non-slip epoxy in some embodiments. In some embodiments, floor coating 228 may be applied to floor panel 150 prior to assembly of storage apparatus 100. Alternatively, floor coating 228 may be applied to floor panel 150 after storage apparatus 100 is assembled. In some applications, floor panel 10 includes a length of about twenty feet and a width of about nine feet, with a thickness of about four inches of pre-stressed concrete.

Figure 8A:
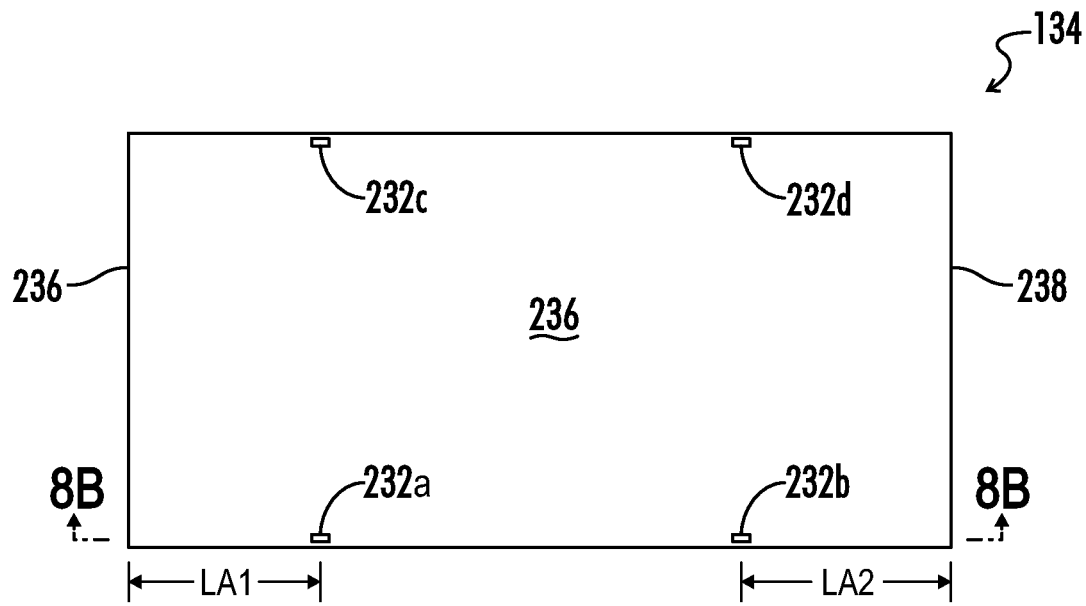
FIG. 8A illustrates a plan view an embodiment of a top panel for a storage apparatus in accordance with the present disclosure.
Figure 8B:
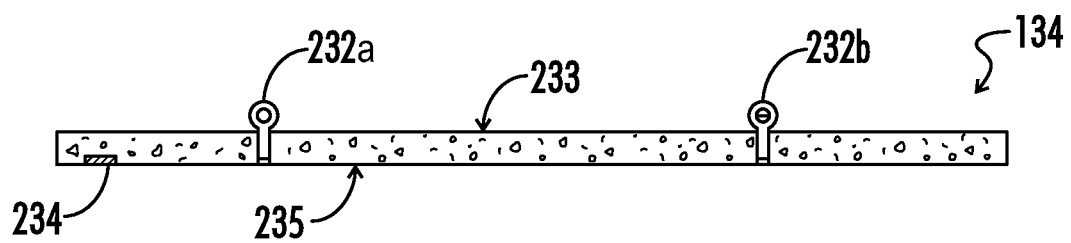
FIG. 8B illustrates a partial cross-sectional view of Section 8B-8B from FIG. 8A showing an embodiment of a top panel.

Referring now to FIG. 8A-8B, in some embodiments, top panel 134 includes a pre-stressed concrete panel including a substantially rectangular shape. Top panel 134 is generally dimensioned to rest atop side panels 138a, 138b and end panel 140 in some embodiments. Top panel 134 includes a thickness of about four inches in some embodiments. Top panel 134 includes a plurality of lift anchors 232 disposed on the top panel top surface 233. Each lift anchor 232 includes an eye bolt fastened to top panel 134, as seen in FIG. 8B. Each lift anchor is spaced from a longitudinal end of top panel 134 by a lift anchor offset distance. For example, a first lift anchor 232a is offset from top panel front end 236 by first lift anchor offset distance LA1. Similarly, a second lift anchor 232b is offset from top panel rear end 238 by a second lift anchor offset distance LA2. In some embodiments, LA2 is greater than LA1. In some embodiments, LA2 is about five feet, and LA1 is about four feet and three and a half inches.

Figure 12B:
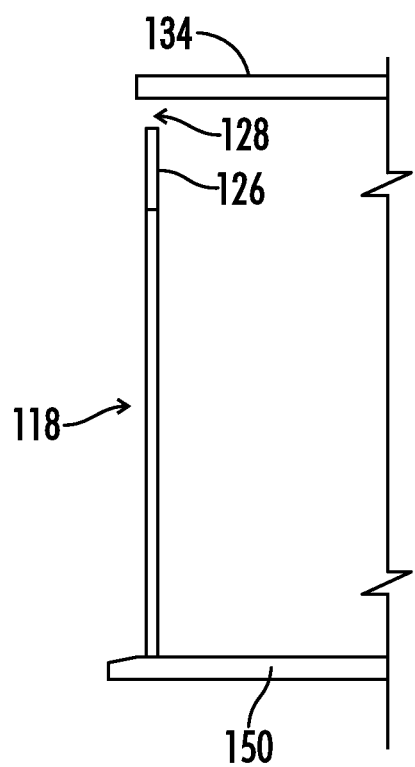
FIG. 12B illustrates a side elevation view of an embodiment of an interior door panel installed in a storage apparatus.

Also seen in FIG. 8B, a top panel plate 234 is embedded in the interior surface 235 of top panel 134. Top panel plate 234 includes a steel plate in some embodiments. Top panel plate 234 spans the width of top panel 134 in some embodiments and can be cast into the top panel such that top panel plate 234 is rigidly secured to top panel 134. In some embodiments, top panel plate 234 includes a steel bar having a width of two inches, a thickness of about five sixteenths of an inch and a length of about nine feet. Top panel plate 234 is generally positioned nearer top panel front edge 236 and may be spaced nearly adjacent to top panel front edge 236, as seen in FIG. 8B. Top panel plate 234 in some applications provides an attachment location for securing a structure on the inside of storage apparatus 100 to top panel 134. In some embodiments, top panel plate 234 provides an attachment location for the metal cage that forms interior door panel 118. The metal cage of interior door panel 118 may be fastened to top panel plate 234 using one or more fasteners or may be welded to top panel plate 234 in some embodiments. In alternative embodiments, as seen in FIG. 12B, interior door panel 116 does not extend vertically all the way to top panel 134, but instead provides a flange gap 128 between interior door panel 118 and the interior surface of top panel 134.

Figure 9A:
FIG. 9A illustrates a plan view of an embodiment of a first side panel in accordance with the present disclosure.
Figure 9B:
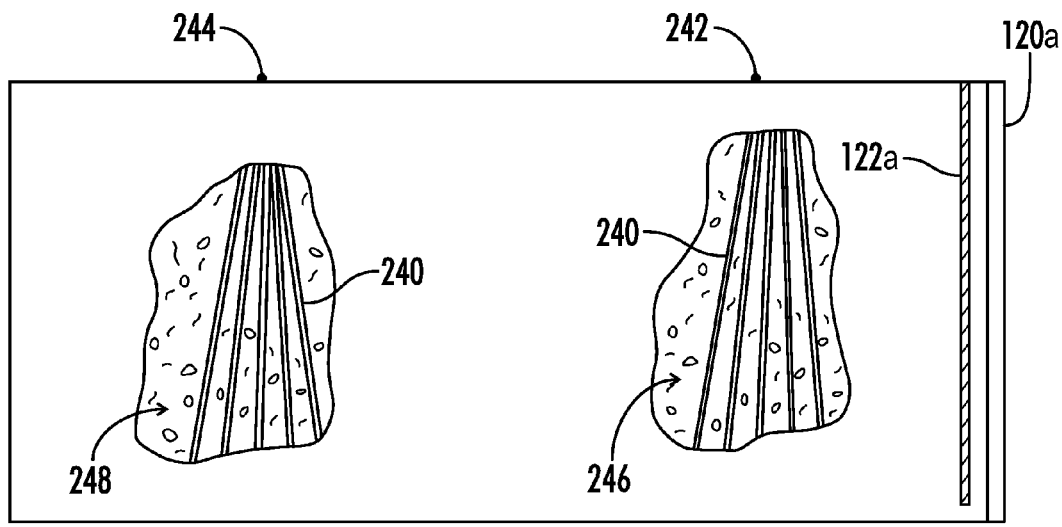
FIG. 9B illustrates a partially broken-away elevation view of the embodiment of a first side panel of FIG. 9A.

Referring now to FIGS. 9A-9B, a first side panel 138a is generally illustrated. First side panel 138a includes a pre-stressed concrete panel having a thickness of about four inches in some embodiments. First side panel 138a includes a first metal plate 122a, or first embedded steel plate, seen in FIGS. 9A and 9B. The first metal plate 122a can be used as an attachment location for securing objects to an interior wall of storage apparatus 100.

Also seen in FIG. 9B, in some embodiments, a plurality of reinforcement bars 240 are embedded, or encapsulated, in first side panel 138a. The plurality of reinforcement bars 240 may include tension members for providing structural support to first side panel 138a. Each reinforcement bar 240 includes a #4 support bar in some embodiments. The plurality of reinforcement bars 240 are divided into at least two groups formed in a triangular pattern. A first bar group 246 is positioned nearer first metal plate 122a. The bars in first bar group 246 converge at a first lifting point 242. One or more bars in first bar group 246 may be connected to first lifting anchor 232a when top panel 134 is positioned on first side panel 138a. A second bar group 248 may also be embedded in first side panel 138a. Second bar group 248 is positioned farther from first metal plate 122a than first bar group 246. Second bar group 248 includes a plurality of reinforcement bars oriented in a triangular pattern converging at a second lifting point 244. One or more bars of second bar group 248 may be connected to second lifting anchor 232b at second lifting point 244 when top panel 134 is installed above first side panel 138a. As such, when storage apparatus 100 is lifted by first and second lifting anchors 232a, 232b, tensile stresses in first side panel 138a may be distributed through the bars in first and second bar groups 246, 248.

Figure 10A:
FIG. 10A illustrates a plan view of an embodiment of a second side panel in accordance with the present disclosure.
Figure 10B:
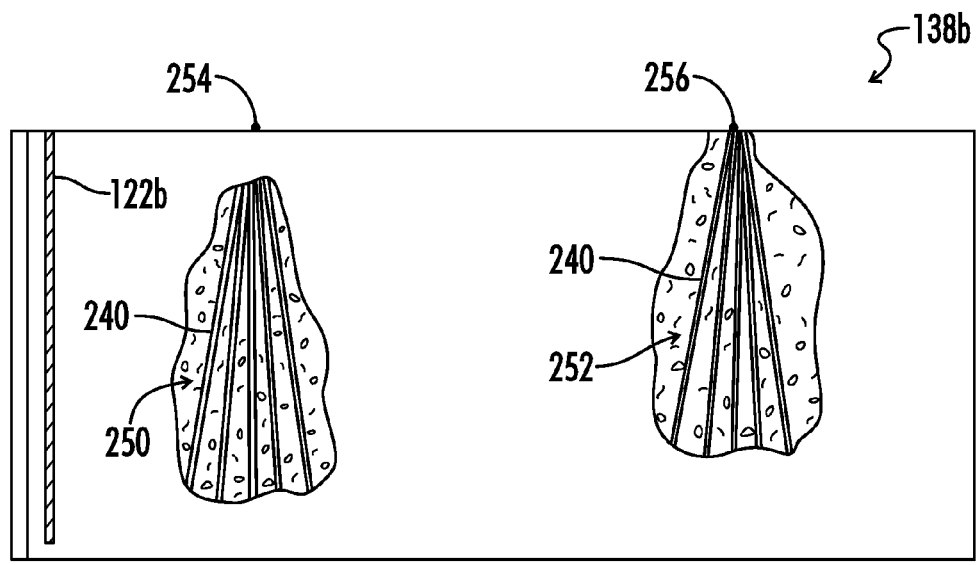
FIG. 10B illustrates a partially broken-away elevation view of the embodiment of a second side panel of FIG. 10A.

Referring now to FIGS. 10A and 10B, in some embodiments, a second side panel 138b is generally illustrated. Second side panel 138b includes a pre-stressed concrete panel having a thickness of about four inches in some embodiments. Second side panel 138b includes a second metal plate 122b, or second embedded steel plate, seen in FIGS. 10A and 10B. The second metal plate 122b can be used as an attachment location for securing objects to an interior wall of storage apparatus 100.

Also seen in FIG. 10A, in some embodiments, a plurality of reinforcement bars 240 are embedded, or encapsulated, in second side panel 138b. The plurality of reinforcement bars 240 may include tension members for providing structural support to second side panel 138b. Each reinforcement bar 240 includes a #4 support bar in some embodiments. The plurality of reinforcement bars 240 are divided into at least two groups formed in triangular patterns. A third bar group 250 is positioned nearer second metal plate 122b. The bars in third bar group 250 converge at a third lifting point 254. One or more bars in third bar group 250 may be connected to third lifting anchor 232c when top panel 134 is positioned on second side panel 138b. A fourth bar group 252 may also be embedded in second side panel 138b. Fourth bar group 252 is positioned farther from second metal plate 122b than third bar group 250. Fourth bar group 252 includes a plurality of reinforcement bars oriented in a triangular pattern converging at a fourth lifting point 256. One or more bars of fourth bar group 252 may be connected to fourth lifting anchor 232d at fourth lifting point 256 when top panel 134 is installed above second side panel 138b. As such, when storage apparatus 100 is lifted by third and fourth lifting anchors 232c, 232d, tensile stresses in second side panel 138b may be distributed through the reinforcement bars.

Figure 13A:
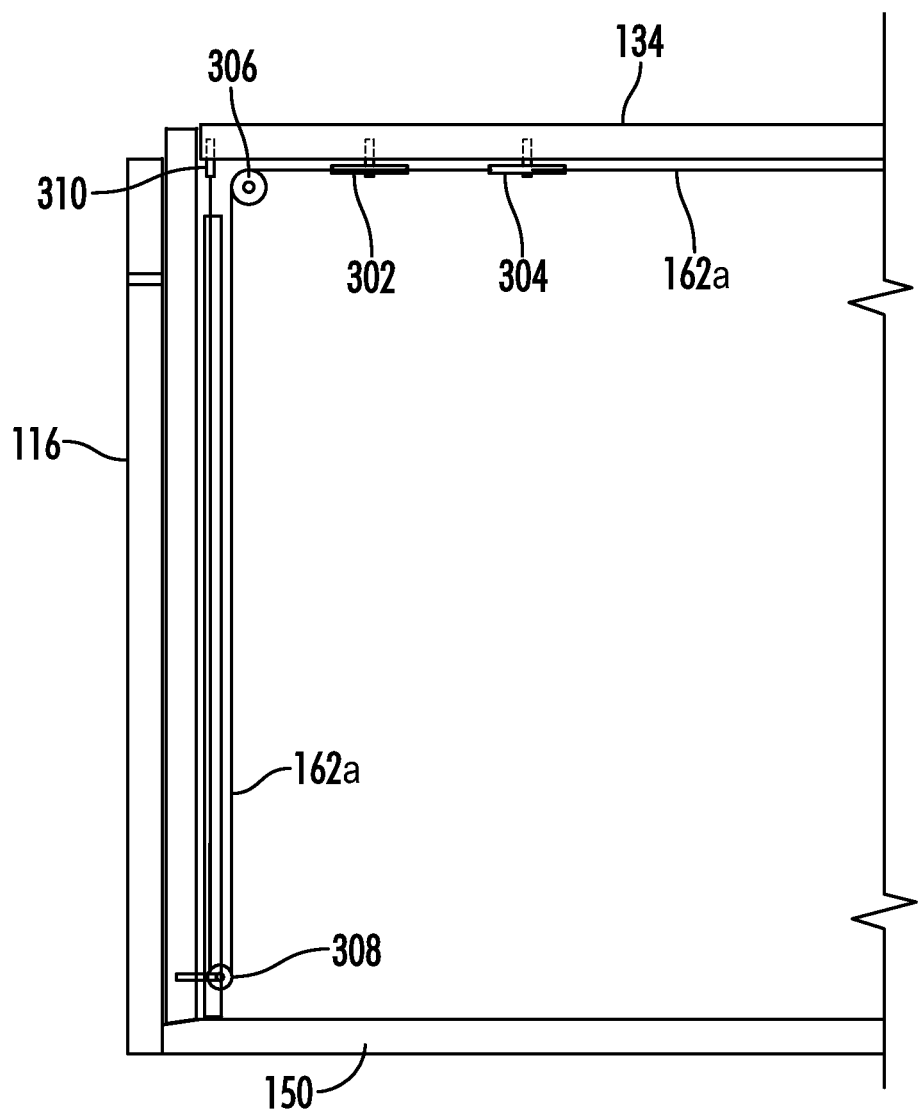
FIG. 13A illustrates a partial interior side elevation view of an embodiment of a storage apparatus including a pulley system showing outer door panel in a closed position.
Figure 13B:
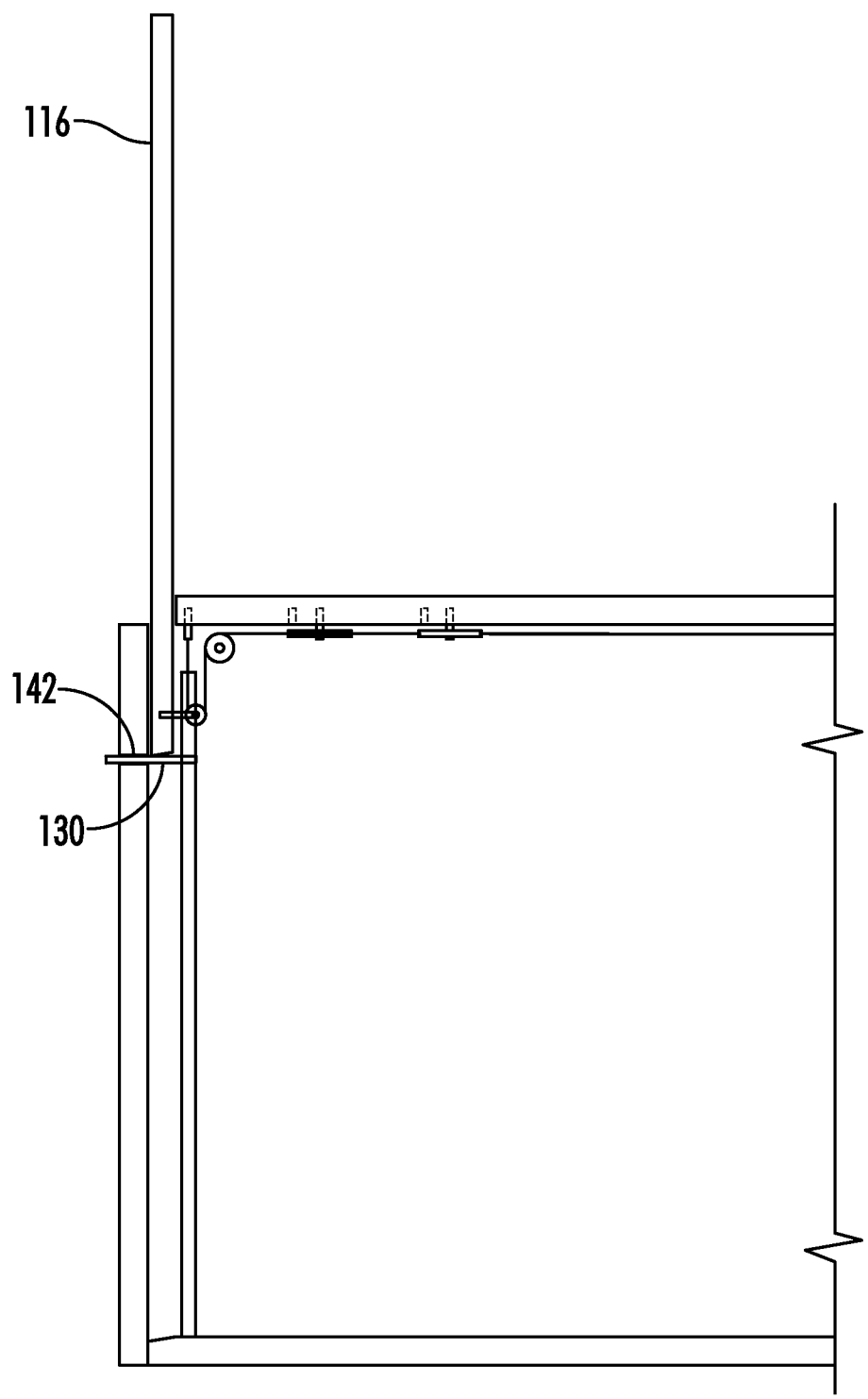
FIG. 13B illustrates a partial interior side elevation view of the embodiment of a storage apparatus of FIG. 13A including a pulley system showing the outer door panel in a raised position.
Figure 14:
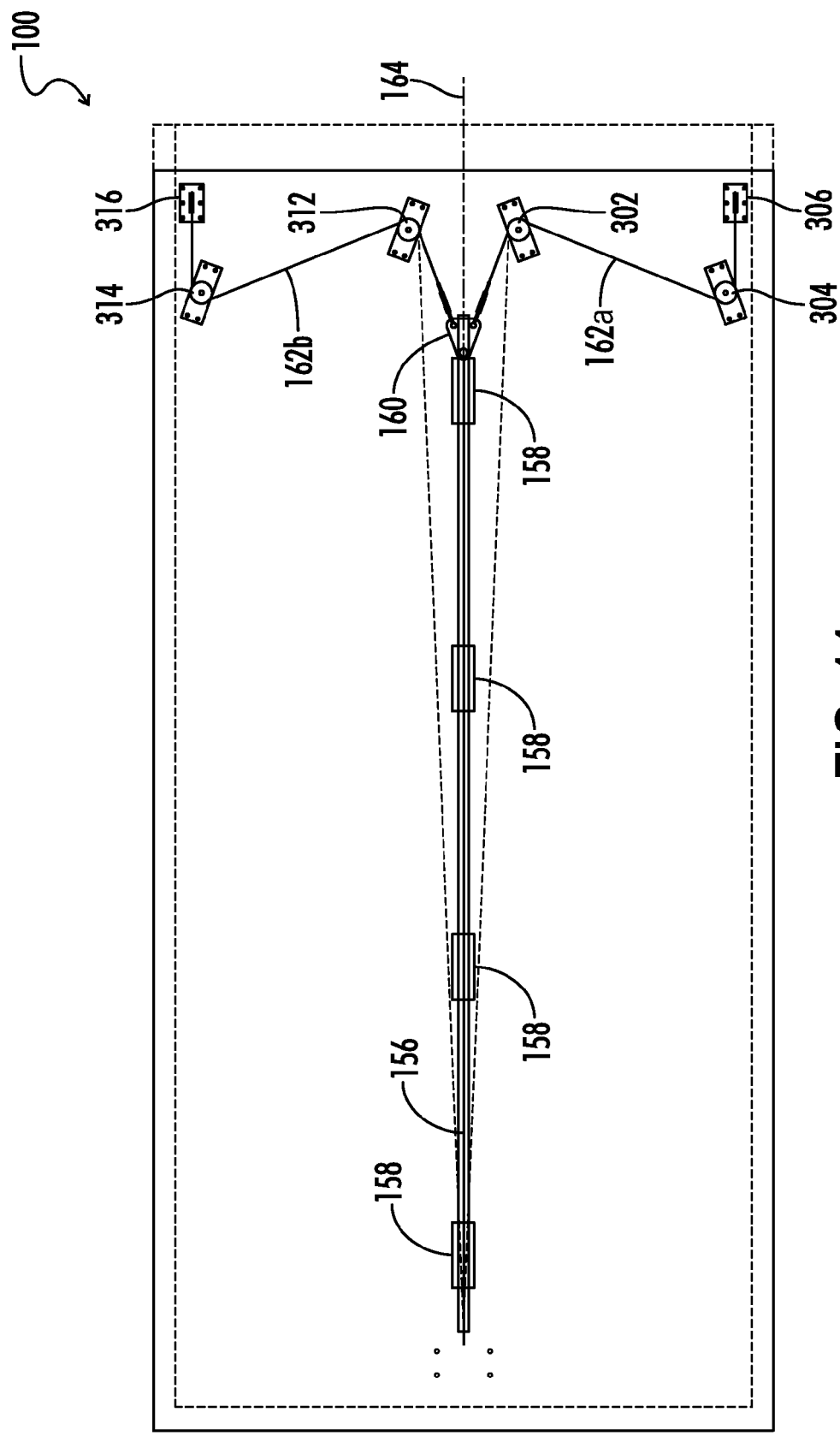
FIG. 14 illustrates an interior plan view showing a pulley system for controlling movement of outer door panel.

Referring now to FIGS. 13A-14, in some embodiments, a pulley system may be included on storage apparatus 100 for selectively raising and lowering outer door panel 116. Door panel 116 includes concrete in some embodiments and may be too heavy for lifting by an individual. One or more pulleys may be provided on storage apparatus 100 for decreasing the force required for lifting door panel 116. FIG. 14 illustrates an interior view of storage apparatus. A primary tension cable 156 may extend longitudinally away from top panel front end 236. Primary tension cable 156 engages a plurality of stationary embedded steel cable plates 158 embedded in the interior surface of top panel 134. Each cable plate 158 provides a wear plate for preventing primary tension cable 156 from eroding the interior surface of top panel 134. A distribution coupling 160 is attached to the forward end of primary tension cable 156. First and second pulley cables 162a, 162b are each attached to distribution coupling 160. First pulley cable 162a extends from coupling 160 generally toward first side panel 138a, and second pulley cable 162b extends from coupling 160 generally toward second side panel 138b. A first turnbuckle is disposed between first pulley cable 162a and coupling 160, and a second turnbuckle is disposed between second pulley cable 162b and coupling 160. Each turnbuckle may be used to adjust the tension in its corresponding pulley cable. Primary cable 156 is generally positioned to be pulled linearly along a primary cable axis 164. Four pulleys are generally positioned on each side of the primary cable axis in some embodiments.

On the first side, or left side, corresponding to the first side panel 138a, or left side panel, a first left pulley 302 is positioned between primary cable axis and first side panel 138a. A second left pulley 304 is positioned between first left pulley 302 and first side panel 138. First and second left pulleys 302, 304 both include a pulley axis of rotation oriented substantially perpendicular to the top panel 134 such that each of first and second left pulleys rotate in a plane substantially parallel to the top panel 134. First pulley wire 162a extends from coupling 160 around first left pulley 302 and reverses direction forming an acute angle around first left pulley 304. A third left pulley 306 is disposed on top panel 134. Alternatively, third left pulley 306 may be mounted on first side panel 138a. Third left pulley 306 is configured to rotate in a plane oriented substantially parallel to first side panel 138a. First pulley wire 162a extends from second left pulley 304 over third left pulley 306 and extends downwardly toward fourth left pulley 308. Fourth left pulley 308 is attached to the interior side of the lower end of outer door panel 116. First pulley wire 162 reversed direction around fourth left pulley 308 at a substantially 180 degree angle and extends upwardly toward top panel 134. First pulley wire 162 is attached to top panel 134 at a first pulley wire anchor 310. In some embodiments, first pulley wire anchor 310 is attached to top panel 134 at top panel bar 234. In other embodiments, third left pulley 306 may be secured to top panel 134 at top panel bar 234.

Referring further to FIG. 14, a second side, or right side, of primary cable axis 164 also includes four pulleys placed opposite and symmetrical to the four pulleys located on the left side of primary cable axis 164. On the second side, or right side, corresponding to the second side panel 138b, or right side panel, a first right pulley 312 is positioned between primary cable axis and second side panel 138b. A second right pulley 314 is positioned between first right pulley 312 and second side panel 138b. First and second right pulleys 312, 314 both include a pulley axis of rotation oriented substantially perpendicular to the top panel 134 such that each of first and second right pulleys rotate in a plane substantially parallel to the top panel 134. Second pulley wire 162b extends from coupling 160 around first right pulley 312 and reverses direction forming an acute angle around first right pulley 314. A third right pulley 316 is also disposed on top panel 134. Alternatively, third right pulley 306 may be mounted on second side panel 138b. Third right pulley 316 is configured to rotate in a plane oriented substantially parallel to second side panel 138b. Second pulley wire 162b extends from second right pulley 314 over third right pulley 316 and extends downwardly toward fourth right pulley 318. Fourth right pulley 318 is attached to the interior side of the lower end of outer door panel 116. Second pulley wire 162b reverses direction around fourth right pulley 318 at a substantially 180 degree angle and extends upwardly toward top panel 134. Second pulley wire 162b is attached to top panel 134 at a second pulley wire anchor opposite first pulley wire anchor. In some embodiments, the second pulley wire anchor is attached to top panel 134 at top panel bar 234. In other embodiments, third right pulley 306 may be secured to top panel 134 at top panel bar 234.

As seen in FIG. 13B, when primary tension cable 156 is pulled away from outer door panel 116, first and second pulley wires 162a, 162b move around their corresponding pulleys and raise first door panel 116. In some embodiments, primary tension cable 156 is coupled to a winch housed on the interior of storage apparatus 100. The winch may be controlled by a wireless signal sent to a communication module housed in the storage apparatus 100. Once the door 116 is raised to a sufficient level, one or more anchor pins 130 may be inserted through corresponding flange pin holes 142 in a panel flange to hold the door 116 in an elevated position. Once the anchor pin 130 is installed, the tension can be released from the primary tension cable 156 and door 116 will rest against each anchor pin 130.

As seen in FIG. 6, in some embodiments, a ratcheting door safety latch 166 may be connected to door 116. Ratcheting door safety latch 166 may include a ratcheting pawl that ratchetedly engages a corresponding vertical ratchet track positioned near door 116. For example, the ratchet track may be located on bracket flange 125, angle bracket 124 interior door panel 118, metal plate 122 or any other suitable adjoining vertical surface.

The storage facility 10 can include interior tool and supply storage shelves 218, as illustrated in FIG. 15. Such storage can include industrial shelving that can accommodate heavy tools and supplies. Certain sections of the floor area can be reserved for open storage of bulky items. Other sections can have steel dividers that can help organize long-handled tools or items of equipment.

A first aid station 222 can be housed in storage facility, and may be mounted on an interior wall on a side panel in some embodiments. This feature includes an eyewash station housed inside storage apparatus 100, along with other safety supplies needed for a construction site. In some embodiments, the storage apparatus 100 can include basic survival supplies for long-term emergencies.

An internally mounted bulletin board may be fastened to the wall to provide a location for company-related announcements and emergency information. On the exterior wall of the facility will be placed special fasteners that will accommodate several small external bulletin boards as required by the owner or other authority for dissemination of certain labor-related issues and safety notifications. The fasteners will allow for the quick and easy dismounting the exterior bulletin boards so that they can be safely removed and stowed in the storage apparatus 100 during periods of non-use. In some embodiments, the fasteners include mechanical fasteners such as hook and loop fasteners, hooks, bolts, rivets, or other fasteners known in the art.

In additional embodiments, one or more security cameras 220 can be positioned on storage apparatus 100 for monitoring the area around the storage facility, as seen in FIG. 15. One or more cameras can be positioned to monitor the staging area for the contractor, or other areas where theft or vandalism is most likely to occur. In one embodiment, at least one camera is connected to an electronic data transmission device, such as communication module 176, operable to transmit video data from the camera via a network. In some embodiments, the electronic data transmission device includes a mobile cellular device operable to wirelessly transmit a signal including video data to a cellular base station.

A weather station can also be positioned in the facility near the top panel 134 and can be battery operated in some embodiments. The weather station can monitor and record the weather data at the jobsite. The weather information can be transmitted using a mobile device or other transmission means to an off-site location. For example, in some embodiments, a signal including weather information can be wirelessly transmitted from a transmitter housed in the facility 10 to an offsite receiver such as a cellular base station. The signal can then be processed and the information can be distributed on the internet to a user who wishes to monitor the weather at the jobsite.

As seen in FIG. 15, in some embodiments, one or more solar panels 168 can be positioned on the roof of top panel 134 of storage apparatus 100. Solar panel 168 can include a photovoltaic solar panel coupled to an electronic circuit for providing electricity to electronic equipment housed in or disposed on storage apparatus 100. For example, solar panel 168 can be connected to one or more batteries for storing electrical power. Such stored electrical power can be used to power mechanical lift or winch coupled to outer door panel 116, a weather station, security camera 220, and/or wireless communications equipment such as a GPS transmitter or other electronic communications equipment attached to storage apparatus 100. In some embodiments, each solar panel 168 is mounted on a moveable bracket so that an optimal orientation of solar panel relative to the sun can be achieved, regardless of the orientation of storage apparatus 100. In other embodiments, each solar panel 168 can be rigidly fixed to top panel 134. In further embodiments, one or more solar panels can be attached to a side panel 138a, 138b or end panel 140. Each solar panel can be coupled to a battery or a battery bank 212 for charging the batteries.

As seen in FIG. 1, in some embodiments, storage apparatus 100 can include a sign or logo 44 illustrated directly onto or affixed to one or more panels of storage facility 10. For example, a sign 144 illustrating a company name can be affixed to a side panel 138, a top panel 134 an end panel 140 or an outer door panel 116 to establish a presence of the company in the community. The public will then view the signage and associate the construction project with the company or service. Additionally, sign or logo 144 can include third-party advertisements in some embodiments.

In further embodiments, a fuel tank is disposed in the storage apparatus 100 to protect fuel from theft or vandalism. Such storage can prevent fuel leaks that can be costly and time-consuming to clean up.

In further embodiments, the storage apparatus 100 can serve as a shelter for workers during bad weather. The prestressed concrete construction of the panels on apparatus 100 is generally able to withstand strong winds, rain, snow or other types of bad weather.

In some applications, multiple storage facilities 100 can be positioned at different locations along one large construction project. Each facility can include a wireless transmitter and a receiver for sending and receiving communication signals between the different storage facilities.

Additionally, when individuals may be positioned in storage apparatus 100, one or more interior lights can be housed within the facility for providing illumination. Such lights can include light emitting diode lighting assemblies and can be connected to the internal battery bank 212 housed within the facility. The lights can be powered by the solar panels 168 in some embodiments.

Thus, it is seen that the apparatus and methods disclosed herein achieve the ends and advantages previously mentioned. Numerous changes in the arrangement and construction of the parts and steps will be readily apparent to those skilled in the art, and are encompassed within the scope and spirit of the present invention as defined by the appended claims.

What is claimed is:

1. A storage apparatus, comprising:
a floor panel;
a first side panel oriented substantially perpendicular to the floor panel, the first side panel including a first vertical edge;
a second side panel oriented substantially perpendicular to the floor panel opposite the first side panel, the second side panel including a second vertical edge;
a top panel resting on the first and second side panels opposite the floor panel;
a first panel flange extending perpendicularly from the first vertical edge;
a second panel flange extending perpendicularly from the second vertical edge;
a vertically moveable concrete outer door panel positioned between the first and second side panels;
an end panel positioned opposite the outer door panel,
wherein the outer door panel is configured to slidably engage the first and second panel flanges;
an interior door panel disposed between the first and second side panels, the interior door panel fixed to the first and second side panels, the interior door panel located between the outer door panel and the end panel;
a first angle bracket attached to the first side panel adjacent the interior door panel, the first angle bracket including a first bracket flange protruding from the first angle bracket in a plane substantially parallel to the outer door panel;
a first flange gap defined between the first bracket flange and the first side flange, the outer door panel vertically moveable in the first flange gap; and
a first metal plate embedded in the first side panel adjacent the interior door panel, wherein the first angle bracket is secured to the first metal plate.

2. The apparatus of claim 1, further comprising:
a second angle bracket attached to the second side panel adjacent the interior door panel.

3. The apparatus of claim 2, further comprising:
the second angle bracket including a second bracket flange protruding from the second angle bracket in a plane substantially parallel to the outer door panel;
a second flange gap defined between the second bracket flange and the second side flange,
wherein the outer door panel is vertically moveable in the second flange gap.

4. The apparatus of claim 3, further comprising:
a second metal plate embedded in the second side panel adjacent the interior door panel,
wherein the second angle bracket is secured to the second metal plate.

* * * * *